(12) United States Patent
Freeman et al.

(10) Patent No.: US 10,511,579 B2
(45) Date of Patent: *Dec. 17, 2019

(54) CONFIDENTIAL MAIL WITH TRACKING AND AUTHENTICATION

(71) Applicant: Microsoft Technology Licensing, LLC, Redmond, WA (US)

(72) Inventors: Trevor W. Freeman, Redmond, WA (US); Mayank Mehta, Redmond, WA (US); Jeremy de Souza, Redmond, WA (US); Jeffrey B. Kay, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/824,752

(22) Filed: Nov. 28, 2017

(65) Prior Publication Data

US 2018/0083934 A1   Mar. 22, 2018

Related U.S. Application Data

(63) Continuation of application No. 11/771,971, filed on Jun. 29, 2007, now Pat. No. 9,847,977.

(51) Int. Cl.
*H04L 29/06* (2006.01)
(52) U.S. Cl.
CPC ........ *H04L 63/0442* (2013.01); *H04L 63/126* (2013.01); *H04L 63/166* (2013.01)
(58) Field of Classification Search
CPC .......... H04L 9/3281; H04L 63/0428
See application file for complete search history.

(56) References Cited

U.S. PATENT DOCUMENTS 6,243,466 B1 * 6/2001 Young ................ H04L 9/0894
380/277
6,947,968 B2   9/2005 Yamaguchi
(Continued)

FOREIGN PATENT DOCUMENTS

WO   2000046952 A1   8/2000

OTHER PUBLICATIONS

Authentication & Acces Control Standards, http://www.bsu.edu/informationtechnology/media/pdf/it_assessstandards.pdf.
(Continued)

*Primary Examiner* — Farid Homayounmehr
*Assistant Examiner* — Suman Debnath
(74) *Attorney, Agent, or Firm* — Merchant & Gould

(57) ABSTRACT

A method for confidential electronic communication between a sender workstation and a receiver workstation is provided, whereby privacy is guaranteed for the electronic communications transmitted over the public Internet. The method of confidential communication is equipped with message tracking and message receipt verification. The system for implementing the method includes a sender server that creates a session content encryption key along with a message envelope that includes a content encryption key encrypted message and a confidential mail token. The content encryption key is stored securely inside the sender organization's system which transmits the message envelope to an intended recipient. The intended recipient processes the message envelope in order to generate a message receipt verification, which is transmitted to the sender. The message receipt verification is processed by the sender server to verify that the message envelope reached the intended recipient. The message receipt verification, which is comprised of the confidential mail token and unique verification data generated by the intended recipient allows
(Continued)

the sender server to verify that the message envelope reached the intended receiver and that the message envelope identified as received is authentic. Following verification that the message transmitted by the sender reached the intended receiver and is authorized, the sender transmits the content encryption key to the intended receiver.

20 Claims, 12 Drawing Sheets

(56) References Cited

U.S. PATENT DOCUMENTS

| | | | |
|---|---|---|---|
| 2002/0007453 A1 | 1/2002 | Nemovicher | |
| 2002/0049681 A1 | 4/2002 | Herreweghen | |
| 2002/0120600 A1 | 8/2002 | Schiavone et al. | |
| 2003/0147536 A1 | 8/2003 | Andivahis et al. | |
| 2004/0158533 A1 | 8/2004 | Messick et al. | |
| 2005/0010644 A1* | 1/2005 | Brown | G06Q 10/107 709/206 |
| 2005/0182937 A1* | 8/2005 | Bedi | H04L 9/083 713/171 |
| 2006/0020799 A1 | 1/2006 | Kemshall | |
| 2006/0021038 A1 | 1/2006 | Brown et al. | |
| 2007/0005713 A1 | 1/2007 | LeVasseur et al. | |
| 2007/0067399 A1 | 3/2007 | Kulkarni et al. | |
| 2007/0101159 A1 | 5/2007 | Zhang et al. | |
| 2007/0162961 A1 | 7/2007 | Tarrance et al. | |
| 2008/0065891 A1 | 3/2008 | Karamchedu et al. | |
| 2009/0006851 A1 | 1/2009 | Freeman et al. | |
| 2009/0034714 A9 | 2/2009 | Boneh et al. | |

OTHER PUBLICATIONS

Tumbleweed MailGate Email Firewall, http://www.tumbleweed.com/pdfs/emf_brochure.pdf.

Bilorusets et al., Web Services Reliable Messaging Protocol (WS-ReliableMessaging), Feb. 2005, 37pgs. http://www6.software.ibm.com/software/developer/library/ws-reliablemessaging200502.pdf.

* cited by examiner

300

| 305 | Encrypted MSG Content | CEK(m) where m represents message content | | 305 |
|---|---|---|---|---|
| 310 | Signature to verify integrity of encrypted message | [Hash(m)]Rs<br>Hash of the message is signed with the private key of sender | | 310 |
| 320 | Confidential Mail Token (BLOB) | Ps(CEK) | Content Encryption Key is encrypted with public key of sender | 330 |
| | | Privacy Policy Bit | Inter-org privacy-mail can be read by organization and is private over the internet<br><br>Intra-org privacy (user privacy) – mail can only be read by IW and is private over the internet and inside the organization | 335 |
| | | CEK(Er) | Email address of recipient is encrypted with symmetric CEK (user@foo.com) | 340 |
| | | CEK(Timestamp) | Timestamp of the message is encrypted with symmetric CEK | 345 |
| | | Hash(CEK(m) + [Hash(m)]Rs) | Allows sender to confirm that receiver has both the blob and message | 350 |
| | | CEK(Hash(CEK(m))) | This allows the sending organization to confirm that the message was indeed delivered to the recipient organization | 355 |
| | | URL | URL of Confidential Mail Web Service exposed on the CAS server | 360 |
| 365 | Signature to verify integrity of BLOB | [Hb]Rs where a hash of the blob is signed by the sender's private key | | 365 |
| 370 | Certificates of sender domain | Certificate issued by Trusted root or possibly a Windows Live SLC | | 370 |

*FIG. 4*

CONFIDENTIAL MAIL WITH TRACKING AND AUTHENTICATION

CROSS-REFERENCE TO RELATED APPLICATIONS

This application is a continuation of U.S. patent application Ser. No. 11/771,971, filed Jun. 29, 2007, now U.S. Pat. No. 9,847,977, which is hereby incorporated by reference in its entirety herein.

BACKGROUND

Confidential Mail with Tracking and Authentication is a process for facilitating confidential electronic communications between two information workers, each of which may be located within different organizations, whereby privacy is guaranteed by the message configuration and not by a directory service within the information worker's organizations.

Generally, in order to facilitate confidential communications between two information workers, there is a need for system administrators of respective organizations to communicate with one another and set up directories and systems that allow for such confidential communications. For example, prior to an information worker within a first company being able to send confidential encrypted electronic communications to an information worker within a second company, the system administrators within both companies need to perform set-up operations for each information worker within the respective organization's rights management server. There is a need for a system and method that provides for confidential electronic message transmission without the need for any administrator intervention or set-up operations within the directories of each organization's rights management server.

There is also a need for a system and method that provides for confidential electronic message transmission that can be verified and authenticated. Current email systems and methods do not allow for verification that an electronic message has actually been received by the intended recipient. Nor do current email systems and methods allow the electronic message transmitted to be authenticated, and thereby providing the sender of the message an assurance that the message has not been intercepted and tampered with. In these current email systems, there is no way for a message sender to prove that the intended receiver actually received the encrypted message sent. The server from which the message was originally sent has to trust that the system and user requesting an encryption key associated with the message previously transmitted actually has the message that corresponds to the encryption key. The problem with these systems and email communication methods is that they can provide no assurance that transmitted message actually reached the intended receiver and that it was not tampered with during transmission.

With current email systems, there is no way of tracking or determining unauthorized message forwarding or interception has occurred. Such pitfalls make traditional e-mail an unattractive solution for the sender of confidential information. Similarly, there is no way to prevent a first user from opening a message received from a sender and alleging; they did not get the message; the document received was not the correct document; that the message could not be decrypted because the key provided didn't correspond with the message. Current electronic mail systems have only limited tracking capabilities. Messages typically cannot be tracked between different communication servers and recipients. There is a need for a system and method of transmitting messages whereby the message may be tracked and assurance is provided that the intended receiver actually received the message. There is a need for a system and message transmission method that can provide proof that the intended receiver actually received the message.

SUMMARY OF THE INVENTION

Confidential mail with tracking verification and authentication may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope. A method for electronic communication with tracking, message receipt verification and message authentication is performed by a system including at least a sender server and a client server, wherein the client server facilitates the creation of a message envelope that includes at least an encrypted message and a confidential mail token. The message envelope transmitted to an intended recipient is processed by the client server in order to generate a message verification receipt, which is transmitted from the recipient to the sender. The message verification receipt is processed by the sender server to verify that the message envelope reached the intended recipient, that the message within the envelope is authentic and that the message was not tampered with during transmission to and from the intended receiver.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings:

FIG. 4 is an illustration of the data fields within a confidential message envelope;

DETAILED DESCRIPTION

Figure 1:
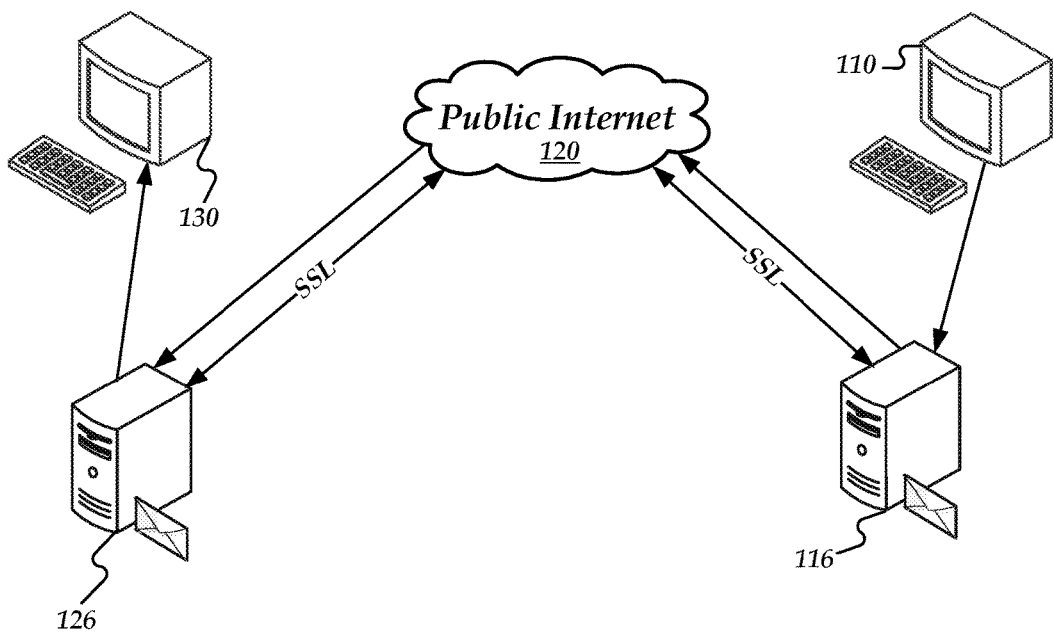
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Confidential electronic message transmission with tracking, verification and authentication may be provided. Consistent with embodiments of the present invention, a system that performs a method for confidential electronic communication between a sender workstation and a receiver workstation is provided, whereby privacy is guaranteed for the electronic communications transmitted over the public Internet. The system that performs the method of confidential electronic communication having message tracking, message authentication and message receipt verification includes at least a sender server, a client server of an intended recipient and a confidential message module which controls message creation, configuration, tracking authentication and verification processing. The sender server creates a session content encryption key along with a message envelope that includes a session content encryption key encrypted message and a confidential mail token. The sender's organization server has a public/private key pair. The session content encryption key is encrypted with the public key of the sender's organization server and stored securely inside the confidential mail token and the message envelope is transmitted from the sender server to the client server of the intended recipient. The client server processes the message envelope and a message receipt verification is generated and transmitted from the receiver to the sender. The message receipt verification is processed by the sender's organization server to authenticate the message envelope and verify that the message envelope reached the intended recipient. The message receipt verification, which is comprised of the recipient's email address, the confidential mail token and unique verification data generated by the client server of the recipient, allows the sender's organization server to verify that the message envelope reached the intended receiver and that the message envelope received by the intended receiver is authentic. Following verification that the message envelope transmitted by the sender was authentic and reached the intended receiver, the sender transmits the session content encryption key to the intended receiver.

The confidential mail token utilized in the method and generated by the sender's organization server of the system is comprised of a plurality of data fields. A first data field within the plurality of data fields within the confidential mail token includes data representative of a content key encrypted with a public key of the sender. A second data field within the plurality of data fields within the confidential mail token includes data representative of a hash of a combination of data representative of the content key encrypted message and data representative of a hash of the sender's message signed with a private key of the sender. A third data field within the plurality of data fields within the confidential mail token includes data representative of a session content encryption key encryption of data representative of the hash of the content key encrypted message. The data within the second data field within the plurality of data fields within the confidential mail token allows the sender to confirm that the receiver has both the confidential mail token and the message. The data within the third data field of the plurality of data fields within the confidential mail token allows the sending organization to confirm that the message was indeed delivered to the recipient organization. The message envelope ties the encrypted message body to the confidential mail token which is used to request the encryption key to unlock the message.

FIG. 1 is a system diagram illustrating an embodiment of the system 100 configuration for facilitating confidential electronic message transmission with tracking, verification and authentication. The sender at an individual workstation 110 initiates a session to send a message. The sender's organization server 116 creates a session content encryption key, encrypts the session content encryption key with the public key of the sender's organization server and stores it securely within a confidential mail token. The sender server creates a message envelope that includes some very specific information, including the confidential mail token and an encrypted message that has been encrypted with the session content encryption key. The message envelope is transmitted from the server's organization server 116 across the public internet 120 to a recipient organization gateway server 126 of the intended recipient. The recipient organization gateway server 126 processes the information within the message envelope, opens an SSL connection to the sender's organization server and transmits a verification message back across the public Internet 120 to the sender's organization server 116 as an acknowledgement that the message envelope has been received. The verification message transmitted by the recipient organization gateway server 126 allows the sender's organization server that transmitted the message to prove that the intended recipient actually received the message and verify that the message received by the intended recipient is authentic and has not been tampered with. Following message verification, the sender's organization server 116 transmits the session content encryption key using an SSL connection across the public Internet to the recipient organization gateway server 126 so that the encrypted message within the previously transmitted message envelope may be decrypted and delivered to the intended recipient 130.

Figure 2:
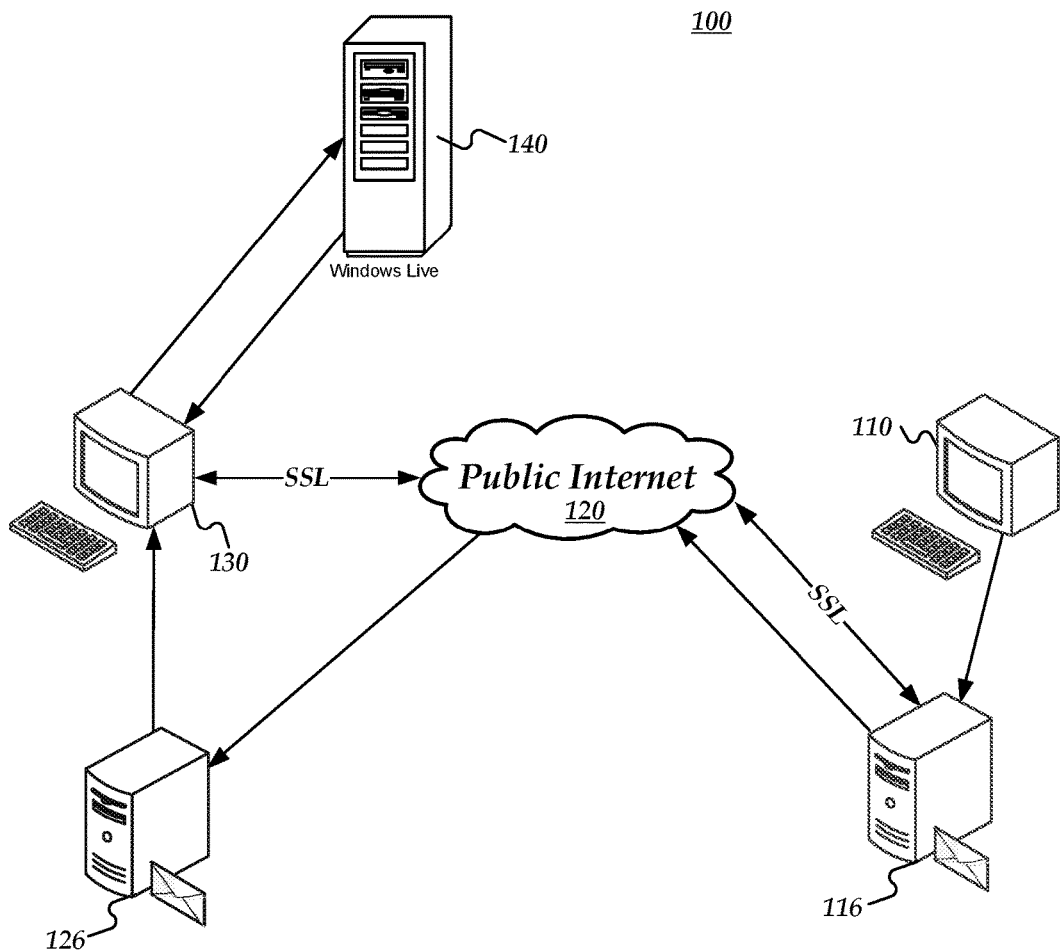
FIG. 2 is a block diagram of an alternative embodiment of an operating environment.

FIG. 2 is a system diagram illustrating another embodiment of the system 100 configuration for facilitating confidential electronic message transmission with tracking, verification and authentication. The sender at an individual workstation 110 initiates a session to send a message. The sender's organization server 116 creates a session content encryption key, encrypts the session content encryption key with the public key of the sender's organization server and stores it securely within a confidential mail token. The sender's organization server creates a message envelope that includes some very specific information, including the confidential mail token and an encrypted message that has been encrypted with the session content encryption key. The message envelope is transmitted from the sender's organization server 116 across the public internet 120 to a recipient organization gateway server 126 of the intended recipient. The recipient organization gateway server 126 processes the information within the message envelope, including the privacy policy bit within the confidential mail token. In this embodiment, the privacy policy bit is set to instruct the sender's web service that it wants to receive a certificate that has the email address of the actual receiver and not the domain of the intended receiver. So, transmitting the domain of the receiving organization will not suffice. The recipient gateway server 126 communicates the need for an individual certificate to the intended recipient client server 130, such as outlook. The client server 130, contacts a Live ID authority 140, such as Windows Live, and obtains a Short Lived Certificate. The client server 130 uses the short lived certificate to negotiate and open an SSL connection with the server's organization server 116 and transmits a verification message back across the public Internet 120 to the sender's organization server 116. The verification message transmitted by the client server 130 includes a certificate including the intended user email address which shall be used by the sender organization along with the other information within the verification message to prove that the intended recipient actually received the message and verify that the message received by the intended recipient is authentic and has not been tampered with. Following message verification, the sender's organization server 116 establishes an SSL connection with the client server 130 and transmits the session content encryption key across the public Internet to the client server 130 so that the encrypted message within the previously transmitted message envelope may be decrypted.

Figure 3:
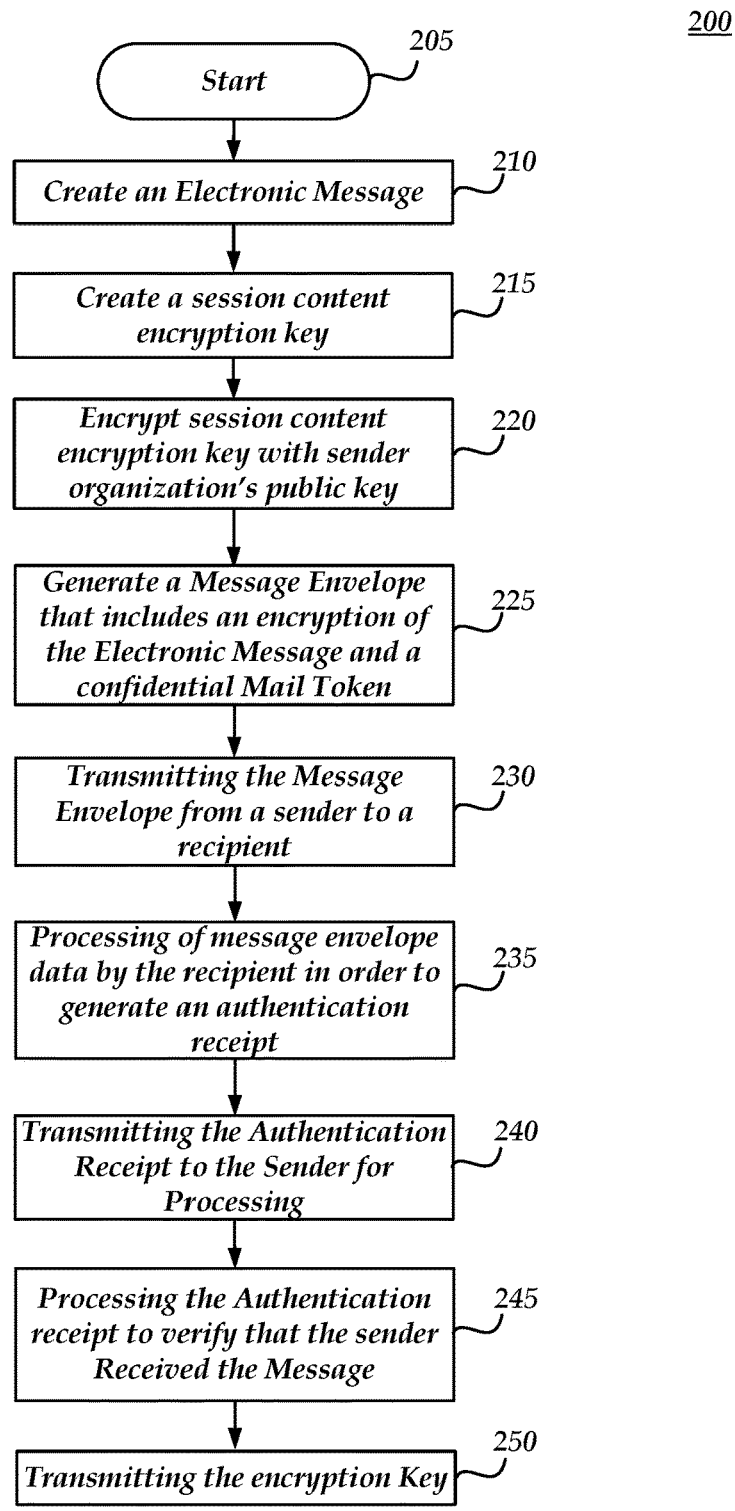
FIG. 3 is a flow chart of a process for providing confidential electronic communication with message receipt verification.

FIG. 3 generally describes the process flow 200 for confidential electronic message transmission with tracking, verification and authentication. When a confidential message session is initiated 205, 210, a session content encryption key is generated 215, and encrypted with the sender's organization server public key 220. A message envelope is generated 225 and it includes an encryption of the electronic message that has been encrypted with the session content encryption key and a confidential mail token. The message envelope is transmitted from the sender's organization server to a recipient organization gateway server 230 where it is processed in order to generate a message verification 235. The message verification receipt is transmitted to the sender, using an SSL channel, for processing 240, where it is processed in order to verify that the intended receiver received the message 245. Following message verification, the sender transmits the session content encryption key 250, using an SSL channel, from the sender to the receiver so that the encrypted message within the previously transmitted message envelope may be decrypted.

The message envelope 300, illustrated in FIG. 4 includes very specific information that is stored in a plurality of data fields within the envelope 300, including an encrypted message that has been encrypted by the session content encryption key 305, a hash of the message signed with a private key of the sender's organization server 310, a confidential mail token 320, a hash of the confidential mail token that has been signed with the private key of the sender's organization server 365 and certificates of the sender's domain 370. The hash of the message is signed with a private key of the sender's organization server 310 in order to verify the integrity of the encrypted message. The hash of the confidential mail token is signed with the private key of the sender 365 in order to verify the integrity of the confidential mail token. The confidential mail token 320 is comprised of a plurality of data fields, the first of which includes data representative of an encrypted session content encryption key, encrypted with the public key of the sender's organization server. A second data field 335 includes data representative of a privacy policy bit. It may be set at the inter-organizational privacy level where mail can be read by the recipient's organization and is private. Or, it may be set at the Intra-organizational level where a message may only be read by individual workstation/intended recipient and is maintained as private over the internet and inside the organization. The manner in which the privacy policy bit is set instructs the sender's web service on whether it requires a certificate that has the email of the intended recipient or if receiving the domain of the intended recipient's organization is sufficient. A third data field 340 includes data representative of an encryption of the email address of the intended recipient, encrypted with the session content encryption key. A fourth data field 345 includes data representative of an encryption of a time stamp, encrypted with the session content encryption key. The encrypted time stamp allows the sender to maintain knowledge of the original time that the message was sent or at least encrypted for tracking purposes. Through use of the time stamp, the sender's web service would be able to track how long it took for an intended recipient to receive an encrypted message and open it up. It would also be used to prove that the intended user did in fact receive a message when they allege that they did not. A fifth data field 350 includes data representative of a hash of a combination of data representative of the session content encryption key encrypted message with data representative of a hash of a message signed with a private key of the sender's organization server. The data within data field 350 is configured to allow the message sender to confirm that the receiver has both the confidential mail token and the message. A sixth data field 355 includes data representative of a session content encryption key encryption of data representative of the hash of the session content encryption key encrypted message. The data within data field 350 allows the sending organization server to confirm that the message was indeed delivered to the recipient organization. The seventh data field 360 includes data representative of the URL of confidential mail service of the sending organization. It is used by the recipient organization gateway server to establish an SSL connection with sender's organization mail web service.

Figure 5A:
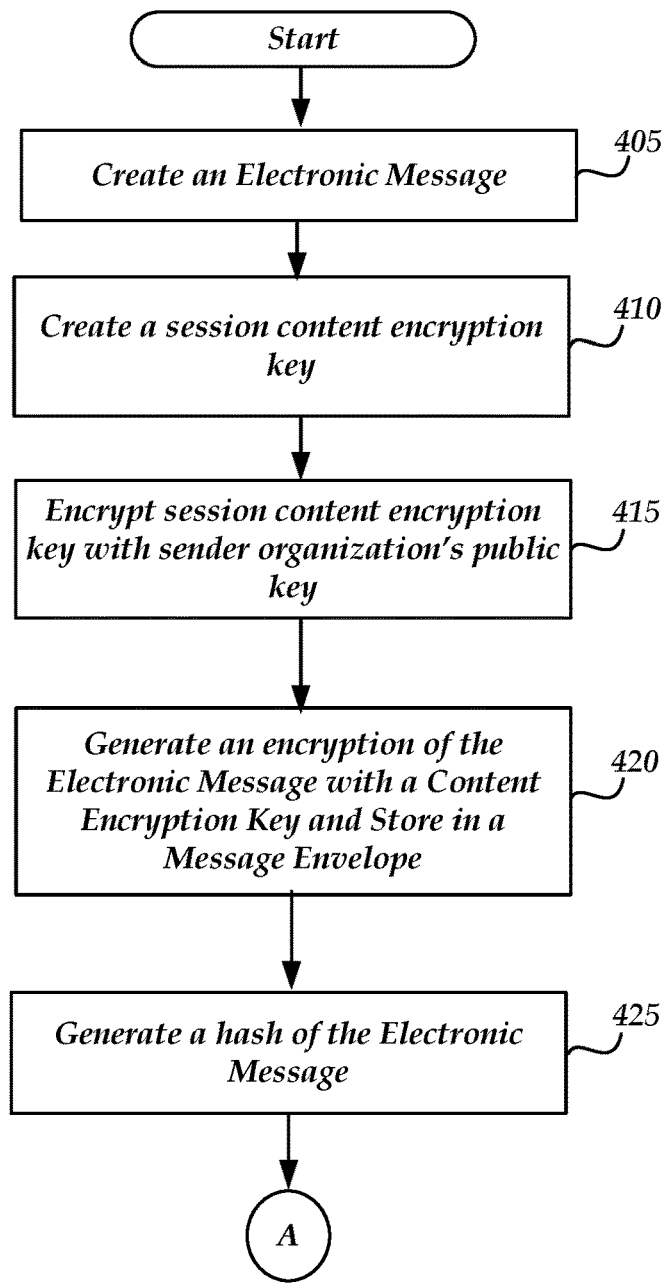
FIG. 5A is a portion of a process flow chart illustrating confidential message transmission between a sender and a receiver and the details surrounding message configuration, processing, tracking, receipt verification and authentication.
Figure 5B:
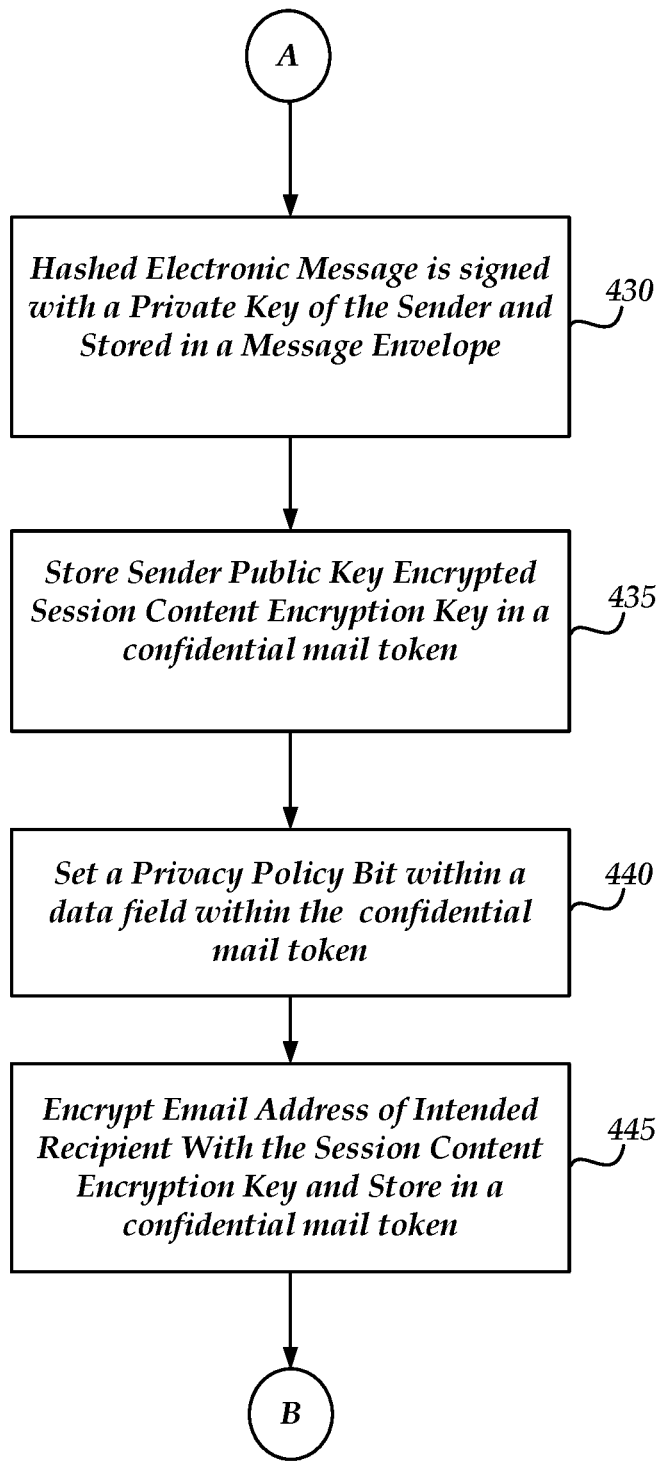
FIG. 5B is a portion of a process flow chart illustrating confidential message transmission between a sender and a receiver and the details surrounding message configuration, processing, tracking, receipt verification and authentication.
Figure 5C:
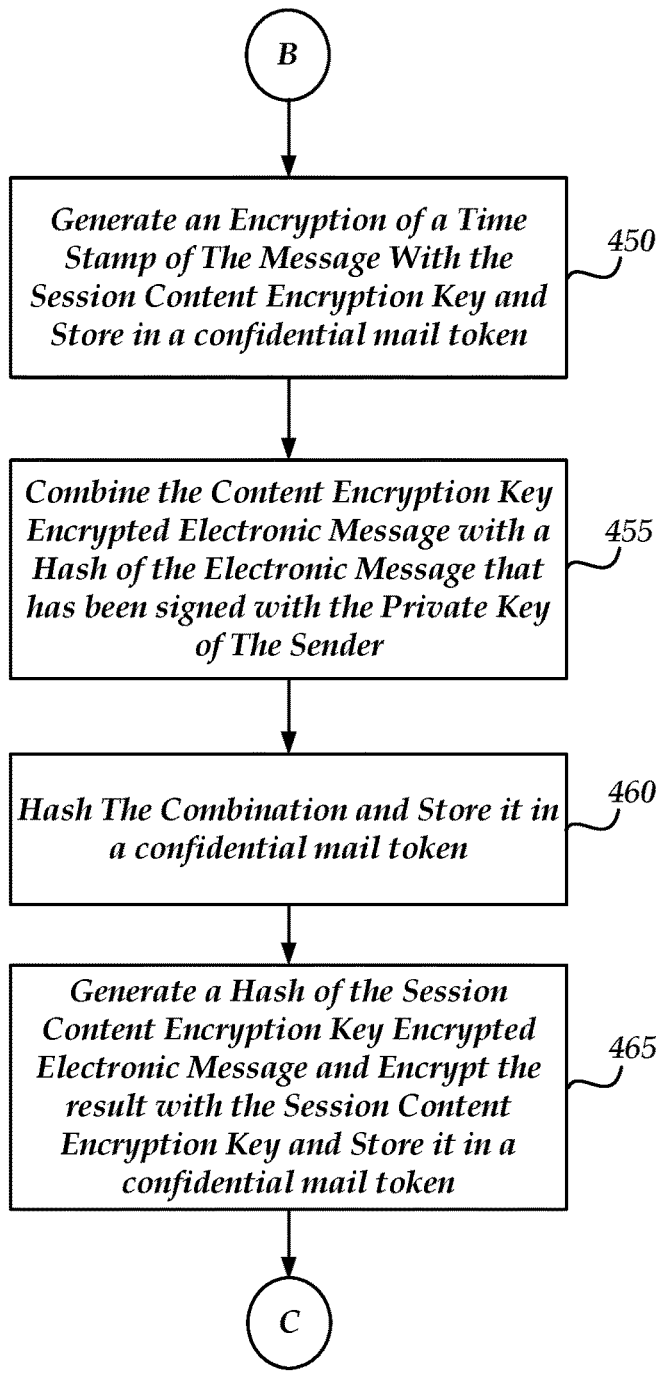
FIG. 5C is a portion of a process flow chart illustrating confidential message transmission between a sender and a receiver and the details surrounding message configuration, processing, tracking, receipt verification and authentication.
Figure 5D:
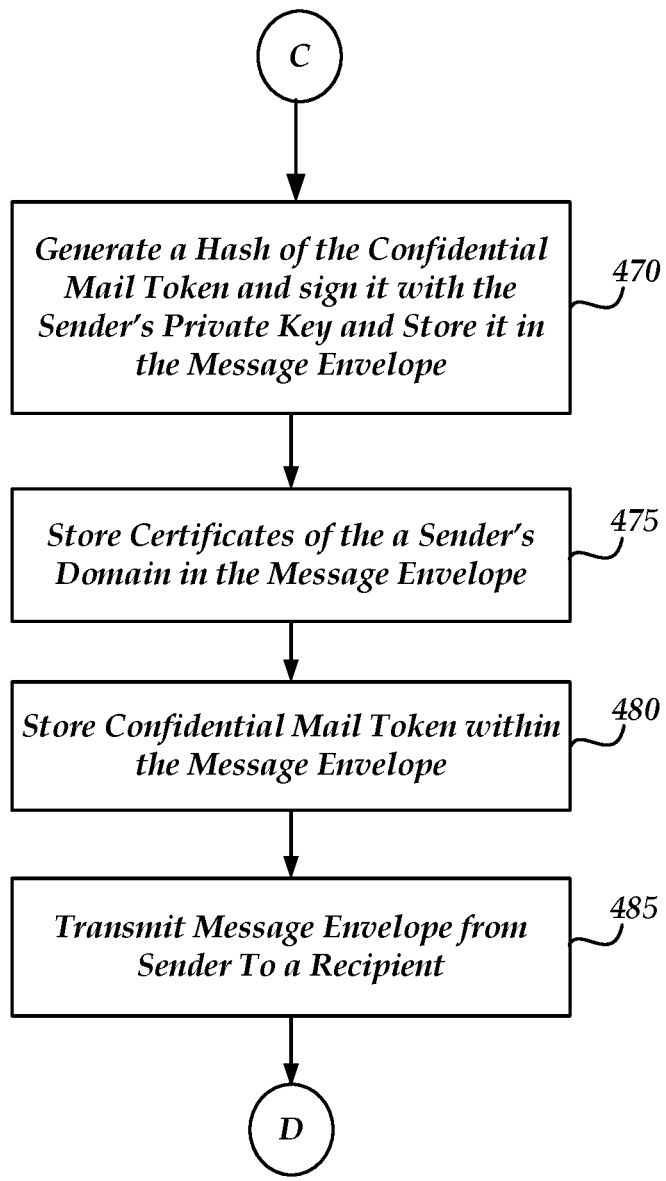
FIG. 5D is a portion of a process flow chart illustrating confidential message transmission between a sender and a receiver and the details surrounding message configuration, processing, tracking, receipt verification and authentication.

FIG. 5A illustrates a more detailed flow chart of the process flow 400 for confidential electronic message transmission with tracking, verification and authentication. When a confidential message session is initiated 405, a session content encryption key is generated 410 and the sender's organization server encrypts the session content encryption key with its public key 415. This allows the sender's organization server to avoid storing a content encryption for each session. Next an encryption of the electronic message is generated and stored in the message envelope, wherein the encryption is performed by the session content encryption key 420. Next a hash of the electronic message is generated 425, signed with a private key of the sender and stored in the message envelope 430. Next. As illustrated in FIG. 5B, the content encryption key that is encrypted with the public key of the sender is stored in a first data field within the confidential mail token 435. This facilitates making the session content encryption key accessible to the sender's organization server without being stored locally within the organization's system. The sender's organization server has access to the session content encryption key following the transmission back of the confidential mail token by the intended recipient. Next, a privacy policy bit within a second data field within the confidential mail token is set 440. Next, the email address of the intended recipient is encrypted with the session content encryption key and stored in a third data field within the confidential mail token 445. As illustrated in FIG. 5C, an encryption of a time stamp of the message is generated with the session content encryption key and stored in a fourth data field within the confidential mail token 450. Next, the session content encryption key encrypted electronic message is combined with a signed hash of the electronic message, signed with a private key of the sender 455 and the combination is hashed and stored in a fifth data field within the confidential mail token 460. Next a hash of the session content encryption key encrypted message is encrypted with the content encryption key and stored in a seventh data field within the confidential mail token 465. As illustrated in FIG. 5D, a hash of the confidential mail token is signed with the private key of the sender and stored in the message envelope 470 along with any certificates of the sender's domain 475. The information within the confidential mail token is stored in the message envelope 480 and the message envelope is transmitted from a sender to an intended recipient 485.

Figure 5E:
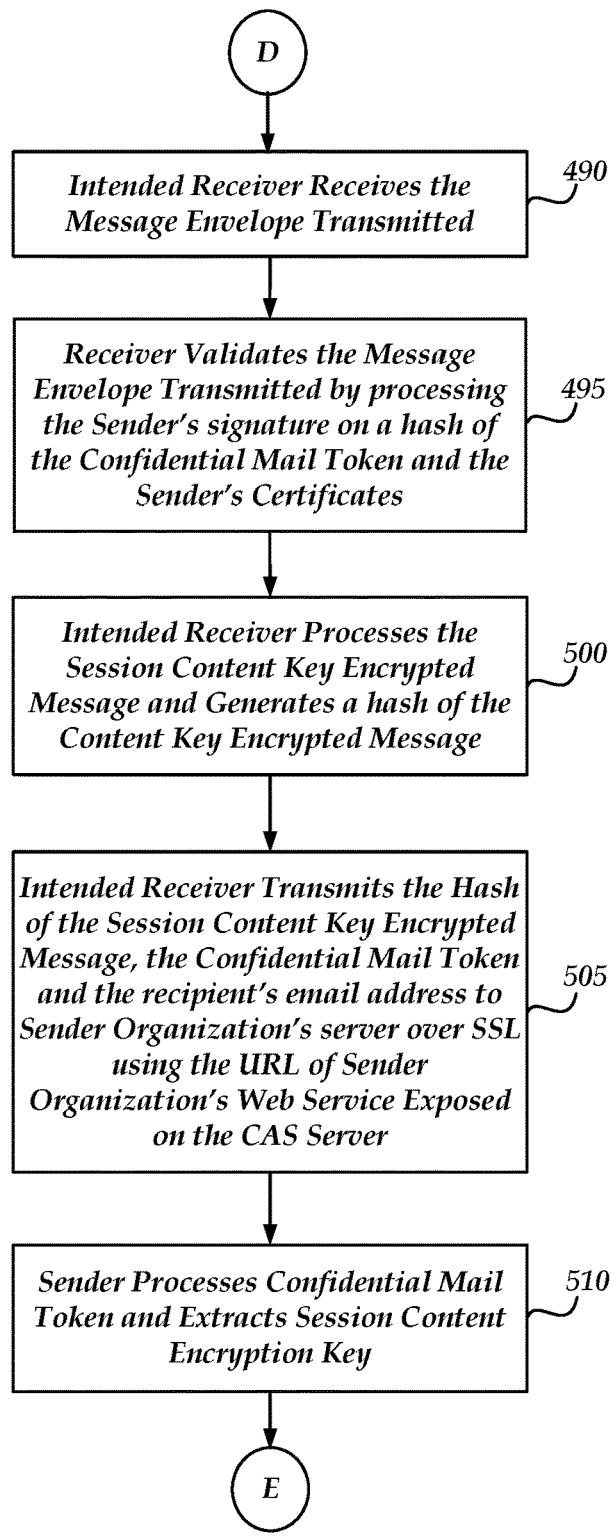
FIG. 5E is a portion of a process flow chart illustrating confidential message transmission between a sender and a receiver and the details surrounding message configuration, processing, tracking, receipt verification and authentication.
Figure 5F:
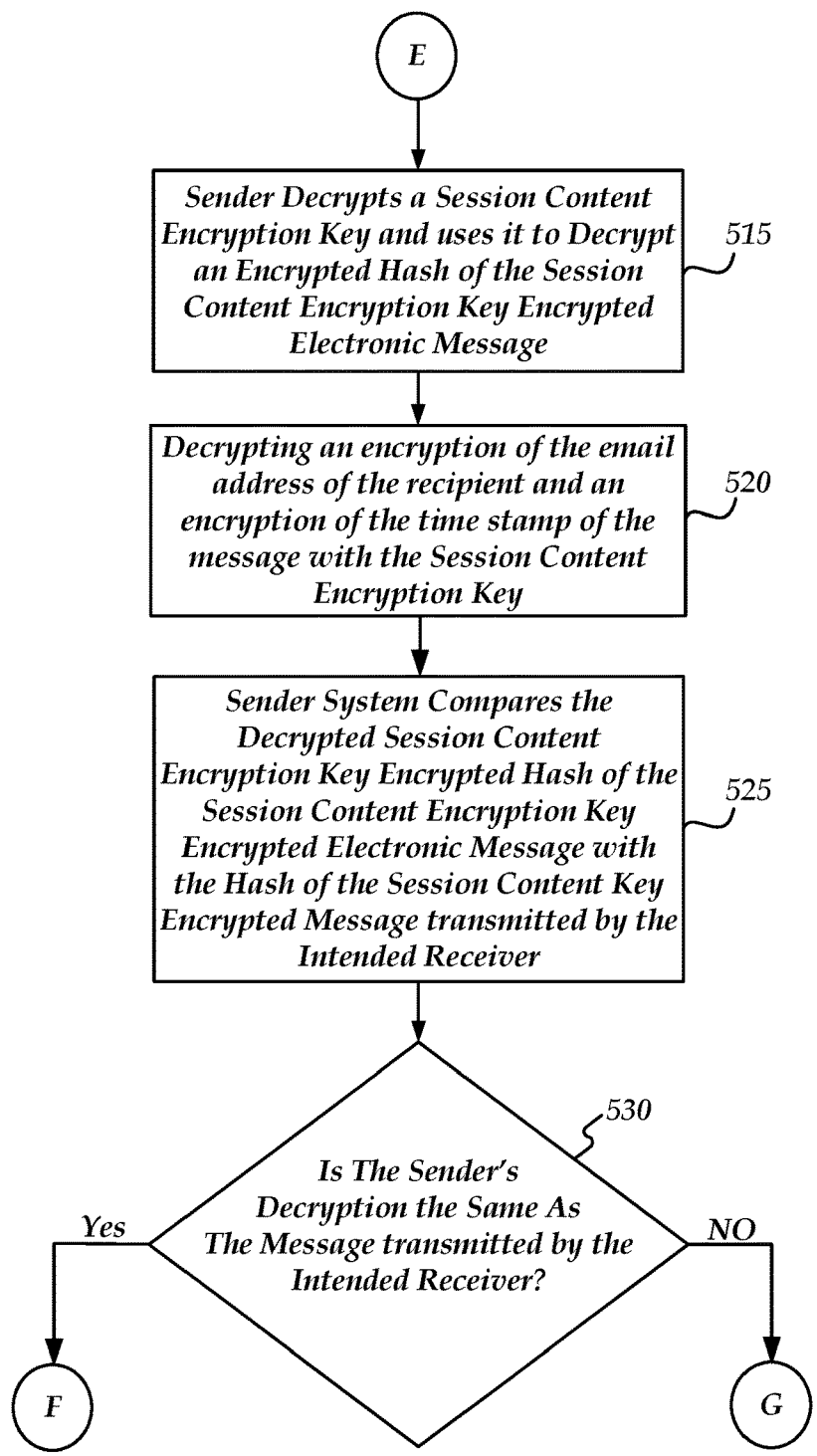
FIG. 5F is a portion of a process flow chart illustrating confidential message transmission between a sender and a receiver and the details surrounding message configuration, processing, tracking, receipt verification and authentication.
Figure 5G:
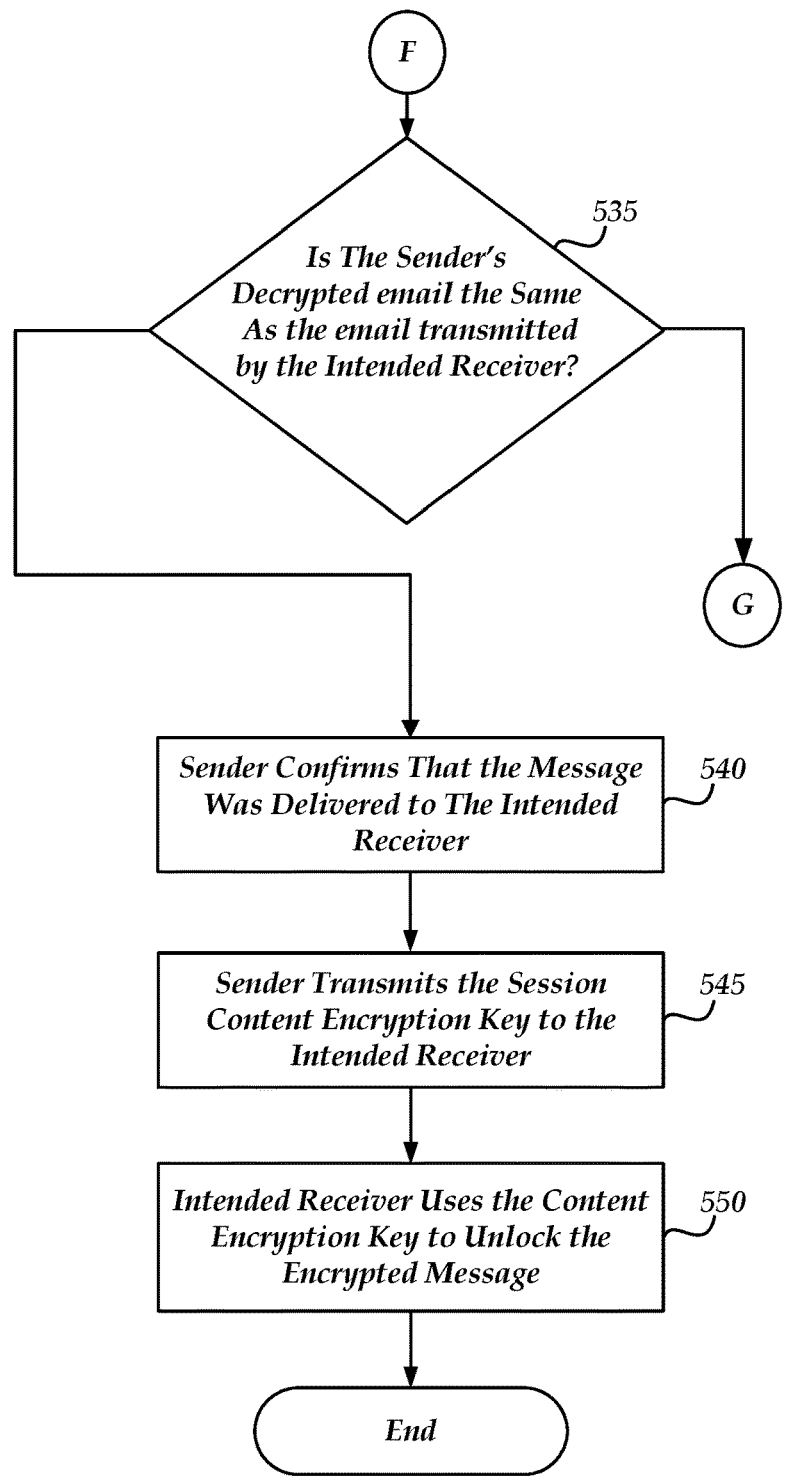
FIG. 5G is a portion of a process flow chart illustrating confidential message transmission between a sender and a receiver and the details surrounding message configuration, processing, tracking, receipt verification and authentication.
Figure 5H:
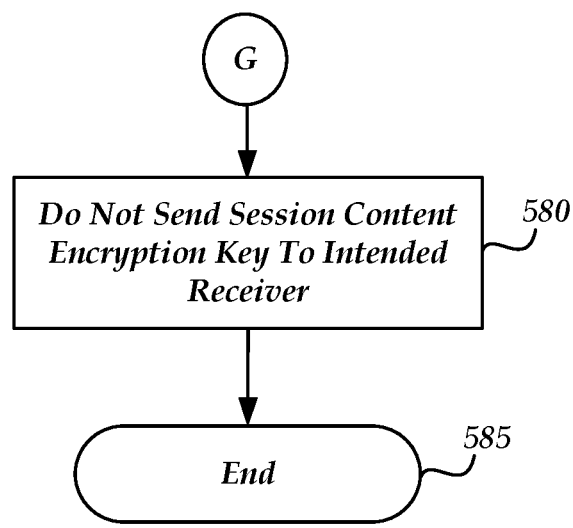
FIG. 5H is a portion of a process flow chart illustrating confidential message transmission between a sender and a receiver and the details surrounding message configuration, processing, tracking, receipt verification and authentication.

As illustrated in FIG. 5E, the receiver receives the message envelope transmitted 490 and processes the data within the envelope in order to validate the message envelope. This is performed by processing the sender's signature on a hash of the confidential mail token and the sender's certificates 495. The receiver also processes the session content encryption key encrypted message in order to facilitate generation of a hash of the session content encryption key encrypted message 500. The receiver establishes an SSL connection with the sender's organization server and transmits the hash of the content encryption key encrypted message, the confidential mail token and the recipient's email address to the sender's organization server using the URL of the sender's organization web service 505. This transmission serves as a message verification receipt. The sender's organization server processes the confidential mail token and extracts the session content encryption key 510. The sender then decrypts the session content encryption key using the sender's organization server public key. As illustrated in FIG. 5F, the sender then uses the session content encryption key to decrypt a hashed content encryption key encrypted message within the confidential mail token 515. The sender's organization server also uses the session content encryption key to decrypt an encryption of the email address of the intended recipient and a content encryption key encryption of the time stamp of the message 520. The sender's organization server then compares the decrypted session content encryption key encrypted hash of the session content encryption key encrypted electronic message with the hash of the session content encryption key encrypted message transmitted by the intended receiver 525. If the sender's organization server's decryption of the hashed content encryption key encryption is the same as the hashed content encryption key encryption generated and transmitted by the receiver 530, and the email address transmitted by the receiver matches the decrypted email address stored by the sender's organization 535, as illustrated in FIG. 5G, then the sender confirms that the encrypted message was delivered to the intended receiver 540 and transmits the session content encryption key to the receiver 545 using an SSL connection. The receiver uses the content encryption key to unlock the encrypted message 550. The result is a confidential communication that has been authenticated and verified as having been received by the intended receiver. However, if the sender's decryption of the hashed content encryption key encrypted message is not the same as the hashed content encryption key encrypted message generated and transmitted by the receiver 520, as illustrated in FIG. 5H, the sender server does not send the session content encryption key to the intended receiver 545 and the transaction is ended. In addition, if the email transmitted by the receiver does not match the decrypted email address stored by the sender's organization in the confidential email token 535, as illustrated in FIG. 5H, the sender does not send the session content encryption key to the intended receiver 545 and the transaction is ended.

Another instance of when the ender server does not send the session content encryption key to the intended receiver is when privacy bit is set to instruct the sender's web service that it wants to receive a certificate that has the email address of the actual receiver and not the domain of the intended receiver. For example, ABC Corporation decides that the way it shall process encrypted messages is that it wants its organization server to open all encrypted messages and simply forward the unencrypted messages to the intended recipients. The corporation desires to perform decryption on behalf of its users and does not want its individual users to have their own certificates having private email addresses thereon. When ABC Corporation's organization server communicates with the web service of the sending organization, the certificate that is presented shall be ABC.com. It will not present the intended recipient's actual email address, for example john.smith@ABC.com. It will simply present the company domain, ABC.com. If the privacy bit within the confidential mail token is set at the intra-organizational privacy level, sender's organization web service will only accept an exact match on the email address of the intended receiver. When the session content encryption key encrypted email address of the intended recipient is compared to domain provided, the transaction will be rejected because the sender's web service wants to see john.smith@ABC.com, not ABC.com. However, if the privacy bit is set at the inter-organizational privacy level, sender's web service will accept a domain level match.

It is understood that it is possible that the ABC Corporation may reject a message where the privacy bit is set at the intra-organizational privacy level. What the intra and inter organizational privacy levels are designed to facilitate is control by the sender over whether the message to be transmitted is sensitive enough that it can only go to the intended recipient or whether it can be submitted at organizational privacy level. When a record is rejected, based on the privacy policy bit setting, the sender knows that intended receiver's server has rejected it because the intended receiver's server would send a reply. An embodiment, illustrated in FIG. 2, illustrates an embodiment of the invention used in combination with Window Live ID or a similar directory service, which may be used to acquire a short short-lived certificate for validation. As FIG. 2, illustrates, the intended receiver 130 could authenticate to that service, such as Windows Live ID 140, receive a certificate back and use that service and certificate to negotiate an SSL connection with the sender's web service to prove an intended recipient identity in order to receive the session content encryption key necessary to unlock the encrypted document. Such a certificate is potentially short-lived, for example, it may be valid for 24 hours at a time. This allows an intended receiver to bypass the process of acquiring a long-lived certificate and go through.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method of verifying that an electronic communication received by an intended recipient is authentic, the method comprising:

creating a session content encryption key and encrypting a message of a sender with the session content encryption key;

encrypting the session content encryption key with a public key of the sender of the encrypted message;

creating a message envelope including at least the encrypted message and a confidential mail token;

storing the encrypted session content encryption key within the confidential mail token;

generating a hash of the electronic message and signing the hash with a private key of the sender;

storing the signed hash in the message envelope;

encrypting an email address of the intended recipient and storing the encrypted recipient email address in the confidential email token;

transmitting the message envelope from the sender to the intended recipient for processing, wherein at least a portion of data within the message envelope is processed to generate a certificate that includes an email address of the recipient of the message envelope;

transmitting, by the recipient, the certificate including the email address of the recipient;

receiving, by the sender, the certificate that includes the transmitted email address from the recipient of the message envelope and the encrypted session content encryption key;

decrypting, via the sender, the session content encryption key extracted from the certificate using the public key and then decrypting the stored encrypted email address of the intended recipient using the decrypted session content encryption key;

comparing the transmitted email address received from the recipient of the message envelope to the decrypted email address of the intended recipient to verify that the message envelope that reached the intended recipient is authentic; and in response to verifying that the message envelope that reached the intended recipient is authentic as a result of the email address received from the intended recipient matching the email address stored in the confidential mail token, establishing a connection with server infrastructure of the intended recipient and the sender transmitting the session content encryption key to the intended recipient for decrypting the encrypted message within the message envelope previously sent to the recipient's server infrastructure.

2. The method of claim 1 wherein the confidential mail token is comprised of a plurality of data fields, wherein a first data field within said plurality of data fields is comprised of data representative of a content encryption key encrypted with the public key of the sender, wherein a second data field within said plurality of data fields is comprised of data representative of a hash of a combination of data representative of the encrypted message encrypted with the content encryption key and data representative of a hash of the message signed with the private key of the sender, wherein a third data field within said plurality of data fields is comprised of data representative of a content encryption key encryption of data representative of the hash of the encrypted message encrypted with the content encryption key.

3. The method of claim 1 wherein the confidential mail token is comprised of a plurality of data fields, wherein a data field within the plurality of data fields includes a privacy policy bit having a first setting which dictates that an encrypted message may be decrypted by an organization server of the intended receiver and forwarded to the intended receiver.

4. The method of claim 1 wherein the confidential mail token is comprised of a plurality of data fields, wherein a data field within the plurality of data fields includes a privacy policy bit having a second setting which dictates that the encrypted message may only be decrypted by the intended receiver through use of the certificate verifying the intended receiver's identity.

5. The method of claim 1 wherein the confidential mail token is comprised of a plurality of data fields, wherein a data field within the plurality of data fields includes an encrypted time stamp that facilitates tracking of timing associated with receipt of the transmitted message envelope.

6. The method of claim 1 wherein the confidential mail token includes a privacy policy bit requiring receipt of the certificate that includes the email address from a recipient of the message envelope.

7. The method of claim 1 wherein a verification receipt comprises the confidential mail token, data representative of the email address of the recipient, and a unique data set generated by the recipient, wherein the unique data set is derived from data within the message envelope.

8. The method of claim 1 further comprising, verifying that the electronic communication was received by the intended recipient through processing of data representative of the email address of the recipient and a unique data set generated by the recipient.

9. The method of claim 1 further comprising:
creating a session content encryption key for each message session initiated;
the message envelope further comprising at least data representative of:
an encrypted version of the electronic communication, encrypted through use of the session content encryption key; and
a hashed version of the electronic communication signed with the private key of a sender;
wherein the confidential mail token is comprised of a plurality of data fields including at least data representative of:
an encryption of the session content encryption key;
a hash of a data combination comprising the encrypted version of the electronic communication and the hashed version of the electronic communication signed with the private key of the sender; and
an encryption of data representative of a hash of the encrypted version of the electronic communication, wherein the encryption is performed through the use of the session content encryption key.

10. The method of claim 9 wherein the encryption of the session content encryption key is performed by use of the sender's private key.

11. The method of claim 9, wherein verifying that the electronic communication was received by the intended recipient comprises:
decrypting the encryption of the session content encryption key and
using the session content encryption key to decrypt the encryption of data representative of a hash of the encrypted version of the electronic communication; and
comparing the decrypted data representative of the hash of the encrypted version of the electronic communication to a hash of the encrypted version of the communication generated by the recipient.

12. The method of claim 8 wherein the message envelope further comprises data representative of:
a signed hash of the confidential mail token, signed with the private key of the sender; and
a certificate representative of a sender domain.

13. The method of claim 9 further comprising the sender verifying that the electronic communication was received by the intended recipient by:
processing the confidential mail token transmitted from the recipient in order to determine the content encryption key;

utilizing the session content encryption key to decrypt the hash of the encrypted version of the electronic communication within the confidential mail token; and comparing the decrypted hash of the encrypted version of the electronic communication within the confidential mail token with the hash of the encrypted version of the communication transmitted by the recipient.

14. A system for authenticating confidential email communications transmitted from a sender to an intended recipient, the system comprising:

a sender server configured to create and transmit an electronic message envelope including at least an encrypted message and a confidential mail token, wherein the encrypted message is forwarded to the intended recipient by the server infrastructure of the sender, and wherein the confidential mail token includes a privacy policy bit; and a certificate pursuant to the privacy policy bit that includes an email address from a recipient of the message envelope, wherein the certificate is forwarded to the sender server within a verification return receipt from the recipient;

wherein the sender server is configured to compare the email address that was included in the certificate in the verification return receipt received from the recipient of the electronic message to an email address of the intended recipient, wherein in response to the stored email address matching the email address received from the recipient, stored in the confidential mail token, the sender server is further configured to verify that the message that reached the intended recipient is authentic, and the sender is configured to establish a connection with the intended recipient's server infrastructure and transmit a session content encryption key to the intended recipient for decrypting the encrypted message within the message envelope previously sent to the recipient's server infrastructure.

15. The system of claim 14 wherein the sender server receives a secret identifier comprising a hash of the encrypted message generated by the intended recipient.

16. A computer-readable storage device which stores a set of instructions which when executed performs a method for providing confidential electronic communication with authentication, the method executed by the set of instructions comprising:

creating a message envelope including at least an encrypted message and a confidential mail token, the encrypted message configured to be decrypted only by server infrastructure associated with an intended recipient, wherein the encrypted message is forwarded to the intended recipient by the server infrastructure of a sender, and wherein the confidential mail token includes a privacy policy bit;

pursuant to the privacy bit, requiring receipt of a certificate that includes an email address from a recipient of the message envelope;

storing an email address of the intended recipient of the encrypted message in the confidential mail token;

transmitting the message envelope from the sender to the intended recipient for processing, wherein at least a portion of data within the message envelope is processed to generate a certificate that includes the email address of the recipient of the message envelope pursuant to the privacy policy bit forwarded with the confidential mail token;

receiving, by the sender, the certificate that includes the email address from the recipient of the message envelope;

comparing the email address that was included in the certificate received from the recipient of the message envelope to the email address of the intended recipient stored in the confidential mail token to verify that the message envelope that reached the intended recipient is authentic; and if the email addresses match, transmitting from the sender a session content encryption key to the intended recipient for decrypting the encrypted message within the message envelope previously sent to the recipient's server infrastructure.

17. The computer-readable storage device medium of claim 16 wherein the method executed by the set of instructions further comprises decrypting a first encryption key encrypted time stamp.

18. The computer-readable storage device of claim 17 wherein a unique data set generated by the intended recipient is processed to verify that the encrypted message is authentic.

19. A method for providing tracking verification of an electronic communication sent to an intended recipient, the method comprising:

creating a message envelope including at least an encrypted message and a confidential mail token, wherein the encrypted message is forwarded to the intended recipient by the server infrastructure of a sender, and wherein the confidential mail token includes a privacy policy bit;

requiring, via the privacy policy bit of the confidential mail token, receipt of a certificate that includes an email address from a recipient of the message envelope;

storing an email address of the intended recipient of the encrypted message in the confidential mail token;

transmitting the message envelope from the sender to the intended recipient for processing, wherein at least a portion of data within the message envelope is processed to generate a verification return receipt including the certificate that includes the email address of the recipient of the message envelope pursuant to the privacy policy bit forwarded with the confidential mail token;

receiving, by the sender, the verification return receipt including the certificate that includes the email address from the recipient of the message envelope;

processing the verification return receipt by the sender comparing the email address that was included in the certificate in the verification return receipt received from the recipient of the message envelope to the email address of the intended recipient stored in the confidential mail token to verify that the recipient of the message envelope is the intended recipient and that the message envelope reached the intended recipient; and in response to verification by the sender that the recipient of the message envelope is the intended recipient as a result of the stored email address of the intended recipient matching the email address received from the recipient, the sender transmitting a session content encryption key to the intended recipient for decrypting the encrypted message within the message envelope previously sent to the recipient's server infrastructure.

20. The method of claim 19 wherein the verification return receipt comprises the confidential mail token, data representative of the email address of the intended recipient, and a unique data set generated by the intended recipient, wherein the unique data set is derived from data within the message envelope.

\* \* \* \* \*